United States Patent [19]

Niimura et al.

[11] Patent Number: 4,908,225

[45] Date of Patent: Mar. 13, 1990

[54] USE OF A RESIN POWDER COMPOSITION FOR ELECTROSTATIC COATING

[75] Inventors: Isao Niimura, Tokyo; Hideo Nagasaka; Manabu Takeuchi, both of Hitachi; Toshiyuki Nita; Susumu Suzuka, both of Tokyo, all of Japan

[73] Assignee: Hodogaya Chemical Co., Ltd., Tokyo, Japan

[21] Appl. No.: 316,537

[22] Filed: Feb. 27, 1989

Related U.S. Application Data

[63] Continuation of Ser. No. 95,215, Sep. 11, 1987, abandoned.

[30] Foreign Application Priority Data

Sep. 18, 1986 [JP]  Japan ................................ 61-217894

[51] Int. Cl.$^4$ ........................... B05D 3/00; C08K 3/10
[52] U.S. Cl. ......................................... 427/25; 427/27
[58] Field of Search .................... 430/109, 110; 427/4, 427/25, 26, 27

[56] References Cited

U.S. PATENT DOCUMENTS

| | | | |
|---|---|---|---|
| 4,248,744 | 2/1981 | Masar et al. | 427/25 |
| 4,495,216 | 1/1985 | Soerensen et al. | 427/25 |
| 4,568,624 | 2/1986 | Ohshima et al. | 430/109 |
| 4,621,039 | 11/1986 | Ciccarelli et al. | 430/110 |
| 4,623,606 | 11/1986 | Ciccarelli | 430/110 |
| 4,673,631 | 6/1987 | Fukumoto et al. | 430/110 |
| 4,685,620 | 8/1987 | Law et al. | 427/27 |

FOREIGN PATENT DOCUMENTS

| | | |
|---|---|---|
| 2429065 | 1/1976 | Fed. Rep. of Germany . |
| 2170215 | 9/1973 | France . |

*Primary Examiner*—John L. Goodrow
*Attorney, Agent, or Firm*—Oblon, Spivak, McClelland, Maier & Neustadt

[57] ABSTRACT

Use of a resin powder composition for electrostatic coating, wherein said resin powder composition comprises (1) a thermosetting or thermoplastic resin and (2) an electric charge-increasing agent incorporated in the resin.

5 Claims, No Drawings

USE OF A RESIN POWDER COMPOSITION FOR ELECTROSTATIC COATING

This application is a Continuation of application Ser. No. 07/095,215, filed on Sept. 11, 1987, now abandoned.

The present invention relates to use of a resin powder composition for electrostatic coating.

In recent years, an attention has been drawn to the usefulness of a powder coating material reflecting the technological progress in the electrostatic powder coating. A powder coating material is advantageous over a solution-type coating material in that it does not use a solvent and thus is free from pollution, the coated article can be used immediately after the application of the coating, and yet a coating layer having a desired thickness can be obtained by a single application treatment. Because of these advantages, there has been a rapid increase in its demand.

In spite of the above-mentioned advantages, however, it still has a number of drawbacks which must be overcome.

Presently available practical methods for electrostatic powder coating are classified into a corona application system, a triboelectrification system and a hybrid system. Every system employs an electrostatic principle.

In the corona application system, a high level of applied voltage is required to give a sufficient electric charge to the powder of coating material, and accordingly, a high voltage generator and an electric shock preventing device are required. Even if such a device is provided, there still remains a possibility of danger such as electric shock to human body or a haphazard due to sparking.

The triboelectrification system has drawbacks such that the apparatus is required to be of a large size in order to impart a sufficient electric charge to the powder of coating material, the particle size is required to be small and the particle size distribution is required to be sharp, and due to the cumbersome operation and a decrease in the yield of pulverized powder during the pulverization and classification steps, the production costs tend to be high.

The hybrid system has the drawbacks of the above-mentioned two systems.

Further, as drawbacks common to all the systems, there may be mentioned irregularities in the thickness or quality of the coated layer due to a non-uniformity in the distribution of the electric charge in the powder of coating material, a difficulty in the control of the thickness of the coated layer due to the difficulty in the control of the electric charge, and a limitation in the choice of the material or shape of the substrate to be coated. The charged powder of coating material is susceptible particularly to an influence of the temperature and humidity, and the coating environment is also limited. In order to form a satisfactory coating layer, an apparatus and environment wherein the temperature and humidity are specially controlled, are required. Furthermore, the most serious drawback common to conventional electrostatic powder coating materials is that the coating efficiency is low. The coating efficiency is about 75% at best according to the conventional coating materials presently available for practical industrial purposes. Further, after the electrostatic deposition, the deposited powder may happen to fall off due to attenuation of the electric charge during the curing step. Accordingly, such non-deposited powder or fallen-off powder will be wasted, or must be recovered by using a special device for recovery and reused by adding the recovered powder in small portions to a fresh powder, or reused by recycling the recovered powder to the resin powder preparation step. In the case of reuse, the apparatus and machines are required to be an exclusive line, whereby it is not easy to change the type or hue of the coating material resin. Thus, the installation cost of the recovery apparatus and the cumbersome operation and time required for the recovery or the change add to the total cost.

The present inventors have conducted extensive research by paying an attention to the fact that the above drawbacks are caused by an electrostatic phenomenon. As a result, it has been found possible to substantially overcome the above drawbacks inherent to the coating by conventional electrostatic powders, by adding an electric charge-increasing agent to a resin powder. The present invention has been accomplished on the basis of this discovery.

The present invention provides use of a resin powder composition for electrostatic coating, wherein said resin powder composition comprises (1) a thermosetting or thermoplastic resin and (2) an electric charge-increasing agent incorporated in the resin.

Now, the present invention will be described in detail with reference to the preferred embodiments.

The resin powder composition for electrostatic coating of the present invention comprises a thermosetting or thermoplastic resin and from 0.01 to 20% by weight of an electric charge-increasing agent. This composition may further contain a curing agent, a pigment, a metal powder, a filler, a flowability controlling agent, a plasticizer or a stabilizer. In the present invention, the thermosetting resin may be of a conventional type such as an epoxy resin, a polyester resin or an acrylic resin. Likewise, thermoplastic resin may be a vinyl chloride resin, a polyamide resin, a cellulose resin, a polyolefin resin, a polyethylene resin, a polyester resin or a nylon resin. These resins may be used alone or in combination as a mixture. Particularly preferred is a thermosetting resin.

The electric charge-increasing agent as the essential component of the present invention may be a metal complex azo compound, a phthalocyanine compound, an anthraquinone compound, an azine compound, a metal compound of an organic carboxylic acid or an alkyl onium salt, which is used as a conventional resin coloring agent or as an electric charge controlling agent for electrophotography. These compounds may be used alone or in combination as a mixture of two or more.

The metal complex azo compound includes, for example, C.I. Solvent Black 22, C.I. Solvent Violet 21 and various metal complex azo compounds as disclosed in Japanese Examined Patent Publication Nos. 17995/1968, 27596/1968 and 6397/1969 and Japanese Unexamined Patent Publication Nos. 141452/1982, 208750/1983, 185653/1983, 78361/1984, 93457/1984, 228259/1984, 100546/1985, 101546/1985, 91667/1986, 155463/1986 and 155464/1986.

The phthalocyanine compound includes, for example, C.I. Solvent Blue 25, C.I. Solvent Blue 55 or phthalocyanine compounds as disclosed in Japanese Examined Patent Publication No. 3372/1979.

The anthraquinone compound includes, for example, C.I. Solvent Blue 11, C.I. Solvent Blue 14 and various anthraquinone compounds as disclosed in Japanese Examined Patent Publication Nos. 42383/1980 and 42860/1982 and Japanese Unexamined Patent Publication Nos. 10149/1982 and 136048/1983.

The azine compound includes, for example, C.I. Solvent Black 5, C.I. Solvent Black 7 and their modified compounds with a higher fatty acid.

The metal compound of an organic carboxylic acid includes, for example, those disclosed in Japanese Examined Patent Publication Nos. 42752/1980 and 7384/1984 and Japanese Unexamined Patent Publication Nos. 124357/1982, 127937/1983, 88743/1984, 88745/1984, 141450/1986 an 69073/1986.

The alkyl onium salt includes, for example, those disclosed in Japanese Unexamined Patent Publication Nos. 158932/1979, 11461/1981, 119364/1982, 267059/1986 and 53944/1987.

The resin powder composition of the present invention may readily be prepared in accordance with a conventional method. For example, the binder resin and the electric charge-increasing agent may be heated, melted and kneaded by means of a conventional mixing machine such as a single screw or multi-screw extruder, a Banbury mixer or heat rolls, then cooled and pulverized at room temperature or under freezing to obtain a powder. As a method for addition, any optional method commonly employed for the preparation of a powder mixture such as a mixing method of a binder resin powder and a powder of an electric charge-incrasing agent, may be employed for the preparation.

The particle size of the resin powder for coating according to the present invention is preferably within a range of from 30 to 250 μm.

The resin powder coating composition of the present invention may further contain in addition to the above components, a hardener, a pigment, a metal powder, a filler, a flowability controlling agent, a plasticizer, a stabilizer and other additives, as the case requires.

The resin coating powder of the present invention may be applied to substrates made of metals, ceramics, plastics, etc., by various electrostatic powder coating machines of a corona application system, a triboelectrification system or a hybrid system. Various primers may be applied to such substrates, or various other pretreatments may be applied to such substrates.

Now, the present invention will be described in further detail with reference to Examples. However, it should be understood that the present invention is by no means restricted to such specific Examples. In these Examples, "parts" means "parts by weight".

EXAMPLE 1

1,000 Parts of a polyester resin (Viron GV-100, manufactured by Toyobo Co., Ltd.), 80 parts of pyromellitic dianhydride and 10 parts of a metal complex azo compound (Spiron Black TRH, manufactured by Hodogaya Chemical Co., Ltd.) as an electric charge-increasing agent, were pulverized and mixed by a high speed mixer, and the mixture was heat-melted and kneaded by an extruder, cooled, then pulverized and classified to obtain a resin powder composition having a particle size distribution of from 30 to 40 μm.

As a Comparative Example, the same composition as above except that no electric charge-increasing agent was incorporated, was prepared in the same manner, and used as a comparative sample.

Then, by using the powder samples obtained by the above method, Comparative Tests for the coating efficiency by a corona application system were conducted.

The results are shown in Table 1. The test conditions for the comparative tests for the coating efficiency were as follows.

CONDITIONS FOR THE COMPARATIVE TESTS FOR COATING

Electrostatic powder coating apparatus: Product of Onoda Cement Co., Ltd. (G×101).
Discharge rate: 128.7 g/min.
Substrate to be coated: Aluminum plate having a thickness of 3 mm, 30 cm×30 cm.
Moving speed of the substrate: 2 m/min.
Distance between the substrate and the forward end of the coating spraygun: 25 cm

TABLE 1

| | Coating environmental conditions | | Example | Comparative Example | |
|---|---|---|---|---|---|
| | Temp. (°C.) | Relative humidity (%) | Applied voltage −30 KV | Applied voltage −30 KV | −60 KV |
| Coating efficiency* (%) | 10 | 20 | 100 | 74 | 90 |
| | 20 | 50 | 99 | 75 | 82 |
| | 25 | 85 | 99 | 63 | 75 |

*Coating efficiency =
$$\frac{\text{Coating weight} \times \text{Moving speed of substrate}}{\text{Discharge rate} \times \text{Width of substrate}} \times 100$$

It is evident from the results in Table 1 that in the case of the Comparative Example wherein no electric charge-increasing agent is incorporated, the coating efficiency can be improved to some extent by increasing the applied voltage, but it still does not reach the level of the Example, and the coating efficiency varies by from 10 to 15% depending upon the coating environmental conditions. Whereas, in the case of the Example of the present invention where the electric charge-increasing agent is incorporated, the coating efficiency was substantially 100% even under a voltage lower than the Comparative Example without any substantial influence by the change of the coating environment.

After the coating, the sample of the Example was subjected to baking treatment at 200° C. for 30 minutes, whereby a uniform strong excellent coating layer was obtained without falling off of the deposited powder up to the baking treatment.

In the same manner as in Example 1, various resin powder compositions for electrostatic coating were prepared. The compositions and the results of the coating efficiency tests are shown as Examples 2 to 39 in Table 2, as compared with the corresponding Comparative Examples wherein no electric charge-increasing agent was incorporated.

TABLE 2

| Coating environmental conditions: Temperature: 20° C. Relative humidity: 50% | | |
|---|---|---|
| Resin powder composition (wt. %) | Applied voltage (KV) | Coating efficiency (%) |
| Example 2 | −35 | 98 |
| Polyester resin | | |
| (Viron GV-700, | | |
| manufactured by | | |
| Toyobo Co., Ltd.) 91 | | |
| Pyromellitic | | |
| dianhydride 8 | | |
| Chromium complex | | |
| compound (4,5-di- | | |

TABLE 2-continued

Coating environmental conditions:
Temperature: 20° C.
Relative humidity: 50%

| Resin powder composition (wt. %) | | Applied voltage (KV) | Coating efficiency (%) |
|---|---|---|---|
| tert-butyl salcylate) | 1 | | |
| Comparative Example 2 | | −35 | 74 |
| Viron GV-700 | 91.9 | | |
| Pyromellitic dianhydride | 8.1 | | |
| Example 3 | | −28 | 96 |
| Epoxy resin (Epikote 1004, manufactured by Shell Co.) | 99 | | |
| Metal complex azo compound (C.I. Solvent Violet 21) | 1 | | |
| Comparative Example 3 | | −28 | 65 |
| Epikote 1004 | 100 | | |
| Example 4 | | +40 | 100 |
| Epoxy resin (Aron Powder E-100, manufactured by Toagosei Chemical Industries Co., Ltd.) | 99.5 | | |
| Azine compound (C.I. Solvent Black 5) | 0.5 | | |
| Comparative Example 4 | | +40 | 78 |
| Aron Powder E-100 | 100 | | |
| Example 5 | | −27 | 95 |
| Epoxy resin (Aron Powder E-500, manufactured by Toagosei Chemical Industries Co., Ltd.) | 99 | | |
| Metal complex compound (C.I. Solvent Black 22) | 1 | | |
| Comparative Example 5 | | −27 | 67 |
| Aron Powder E-500 | 100 | | |
| Example 6 | | −39 | 100 |
| Acrylic resin (Aron Powder A-100, manufactured by Toagosei Chemical Industries Co., Ltd.) | 99 | | |
| Phthalocyanine compound (C.I. Solvent Blue 25) | 1 | | |
| Comparative Example 6 | | −39 | 71 |
| Aron Powder A-100 | 100 | | |
| Example 7 | | +25 | 93 |
| Nylon resin (Rilusan, manufactured by Nippon Rilusan Co., Ltd.) | 99 | | |
| Nigrosine compound (Oleic acid-modified product of C.I. Solvent Black 7 | 1 | | |
| Comparative Example 7 | | +25 | 65 |
| Rilusan | 100 | | |
| Example 8 | | −25 | 100 |
| Polyester resin (Aron Powder P-200, manufactured by Toagosei Chemical Industries Co., Ltd.) | 99.5 | | |
| Metal complex compound (Spiron Black TRH, manufactured by Hodogaya Chemical Co., Ltd.) | 0.5 | | |
| Comparative Example 8 | | −25 | 72 |
| Aron Powder P-200 | 100 | | |
| Example 9 | | −30 | 99 |
| Vinyl chloride resin (Aron Powder V-100, manufactured by Toagosei Chemical Industries Co., Ltd.) | 99 | | |
| Anthraquinone compound (C.I. Solvent Blue 11) | 1 | | |
| Comparative Example 9 | | −30 | 75 |
| Aron Powder V-100 | 100 | | |
| Example 10 | | −25 | 99 |
| Epoxy resin (Aron Powder E-150, manufactured by Toagosei Chemical Industries Co., Ltd.) | 99 | | |
| Metal complex azo compound (Compound of Example 2 in Japanese Examined Patent Publication No. 17995/1968) | 1 | | |
| Comparative Example 10 | | −25 | 61 |
| Aron Powder E-150 | 100 | | |
| Example 11 | | −32 | 98 |
| Acrylic resin (Aron Powder A-100) | 99.5 | | |
| Metal complex azo compound (Compound of Example 1 in Japanese Examined Patent Publication No. 27596/1968) | 0.5 | | |
| Comparative Example 11 | | −32 | 67 |
| Aron Powder A-100 | 100 | | |
| Example 12 | | −27 | 96 |
| Polyester resin (Aron Powder P-200, manufactured by Toagosei Chemical Industries Co., Ltd.) | 99 | | |
| Metal complex azo compound (Compound of Example 1 in Japanese Unexamined Patent Publication No. 11049/1983) | 1 | | |
| Comparative Example 12 | | −27 | 45 |
| Aron Powder P-200 | 100 | | |
| Example 13 | | −30 | 99 |
| Vinyl chloride resin (Aron Powder V-100) | 99 | | |
| Metal complex azo compound (Compound of Example 1 in Japanese Unexamined Patent Publication No. 185653/1983) | 1 | | |
| Comparative Example 13 | | −30 | 75 |
| Aron Powder V-100 | 100 | | |
| Example 14 | | −35 | 100 |
| Vinylidene fluoride resin (Aron Powder F-100, manufactured by Toagosei Chemical Industries Co., Ltd.) | 99.5 | | |
| Metal complex azo compound (Compound of Example 1 in Japanese Unexamined Patent Publication No. 78361/1984) | 0.5 | | |
| Comparative Example 14 | | −35 | 68 |
| Aron Powder F-100 | 100 | | |

TABLE 2-continued

Coating environmental conditions:
Temperature: 20° C.
Relative humidity: 50%

| Resin powder composition (wt. %) | | Applied voltage (KV) | Coating efficiency (%) |
|---|---|---|---|
| Example 15 | | −27 | 98 |
| Nylon resin (Rilusan) | 98 | | |
| Metal complex azo compound (Compound of Example 2 in Japanese Unexamined Patent Publication No. 93457/1984) | 2 | | |
| Comparative Example 15 | | −27 | 60 |
| Rilusan | 100 | | |
| Example 16 | | +28 | 100 |
| Polyester resin (Viron GV-100) | 91 | | |
| Pyromellitic dianhydride | 8 | | |
| Metal complex azo compound (Compound of Example 2 in Japanese Unexamined Patent Publication No. 100546/1985) | 1 | | |
| Comparative Example 16 | | +28 | 54 |
| Viron GV-100 | 91.9 | | |
| Pyromellitic dianhydride | 8.1 | | |
| Example 17 | | +25 | 99 |
| Epoxy resin (Aron Powder E-160, manufactured by Toagosei Chemical Industries Co., Ltd.) | 99.5 | | |
| Metal complex azo compound (Compound of Example 3 in Japanese Unexamined Patent Publication No. 101546/1985) | 0.5 | | |
| Comparative Example 17 | | +25 | 61 |
| Aron Powder E-160 | 100 | | |
| Example 18 | | −24 | 98 |
| Acrylic resin (Aron Powder A-200) | 97 | | |
| Metal complex azo compound (Compound of Example 2 in Japanese Unexamined Patent Publication No. 91667/1986) | 3 | | |
| Comparative Example 18 | | −24 | 53 |
| Aron Powder A-200 | 100 | | |
| Example 19 | | −30 | 100 |
| Epoxy resin (Aron Powder E-201) | 99.3 | | |
| Metal complex azo compound (Compound of Example 1 in Japanese Unexamined Patent Publication No. 155463/1986) | 0.7 | | |
| Comparative Example 19 | | −30 | 65 |
| Aron Powder E-201 | 100 | | |
| Example 20 | | −25 | 99 |
| Polyester resin (Aron Powder P-250) | 99.8 | | |
| Metal complex azo compound (Compound of Example 1 in Japanese Unexamined Patent Publication No. 155464/1986) | 0.2 | | |
| Comparative Example 20 | | −25 | 63 |
| Aron Powder P-250 | 100 | | |
| Example 21 | | −30 | 97 |
| Vinylidene fluoride resin (Aron Powder F-100) | 95 | | |
| Phthalocyanine compound (Compound of Example 1 in Japanese Examined Patent Publication No. 3372/1979) | 5 | | |
| Comparative Example 21 | | −30 | 52 |
| Aron Powder F-100 | 100 | | |
| Example 22 | | −35 | 100 |
| Polyester resin (Viron GV-100) | 90 | | |
| Pyromellitic dianhydride | 9 | | |
| Phthalocyanine compound (C.I. Solvent Blue 55) | 1 | | |
| Comparative Example 22 | | −35 | 72 |
| Viron GV-100 | 90.9 | | |
| Pyromellitic dianhydride | 9.1 | | |
| Example 23 | | −25 | 98 |
| Acrylic resin (Aron Powder A-100) | 98 | | |
| Anthraquinone compound (Compound of Example 1 in Japanese Examined Patent Publication No. 42383/1980) | 2 | | |
| Comparative Example 23 | | −25 | 67 |
| Aron Powder A-100 | 100 | | |
| Example 24 | | −30 | 97 |
| Vinyl chloride resin (Aron Powder V-100) | 97 | | |
| Anthraquinone compound (Compound of Example 5 in Japanese Examined Patent Publication No. 42860/1982) | 3 | | |
| Comparative Example 24 | | −30 | 58 |
| Aron Powder V-100 | 100 | | |
| Example 25 | | −23 | 98 |
| Epoxy resin (Aron Powder E-350) | 94 | | |
| Anthraquinone compound (Compound of Example 1 in Japanese Unexamined Patent Publication No. 136048/1983) | 6 | | |
| Comparative Example 25 | | −23 | 62 |
| Aron Powder E-350 | 100 | | |
| Example 26 | | +28 | 95 |
| Polyester resin (Viron GV-100) | 90 | | |
| Pyromellitic dianhydride | 7 | | |
| Alkyl pyridium compound (Compound of Example 1 in Japanese Unexamined Patent Publication No. 158932/1979) | 3 | | |
| Comparative Example 26 | | +28 | 57 |
| Viron GV-100 | 92.8 | | |
| Pyromellitic dianhydride | 7.2 | | |
| Example 27 | | −25 | 99 |
| Nylon resin (Rilusan, manufactured by Nippon Rilusan | | | |

TABLE 2-continued

Coating environmental conditions:
Temperature: 20° C.
Relative humidity: 50%

| Resin powder composition (wt. %) | | Applied voltage (KV) | Coating efficiency (%) |
|---|---|---|---|
| Co., Ltd.) | 99 | | |
| Alkyl salicyclic acid metal complex compound (Compound of Example 1 in Japanese Examined Patent Publication No. 42752/1980) | 1 | | |
| Comparative Example 27 | | −25 | 58 |
| Rilusan | 100 | | |
| Example 28 | | +30 | 97 |
| Epoxy resin (Aron Powder E-100) | 98 | | |
| Alkyl onium salt (Compound of Example 1 in Japanese Unexamined Patent Publication No. 11461/1981) | 2 | | |
| Comparative Example 28 | | +30 | 65 |
| Aron Powder E-100 | 100 | | |
| Example 29 | | −25 | 98 |
| Acrylic resin (Aron Powder A-100) | 97 | | |
| Metal compound of organic carboxylic acid (Compound of Example 1 in Japanese Unexamined Patent Publication No. 124357/1982) | 3 | | |
| Comparative Example 29 | | −25 | 62 |
| Aron Powder A-100 | 100 | | |
| Example 30 | | +27 | 97 |
| Acrylic resin (Aron Powder A-201) | 99 | | |
| Alkyl onium salt (Compound of Example 1 in Japanese Unexamined Patent Publication No. 119364/1982) | 1 | | |
| Comparative Example 30 | | +27 | 65 |
| Aron Powder A-201 | 100 | | |
| Example 31 | | −30 | 100 |
| Polyester resin (Aron Powder P-200) | 98 | | |
| Metal compound of organic carboxylic acid (Compound of Example 1 in Japanese Unexamined Patent Publication No. 127937/1983) | 2 | | |
| Comparative Example 31 | | −30 | 63 |
| Aron Powder P-200 | 100 | | |
| Example 32 | | −28 | 99 |
| Vinyl chloride resin (Aron Powder V-100) | 99 | | |
| Metal compound of organic carboxylic acid (Compound of Example 1 in Japanese Examined Patent Publciation No. 7384/1984) | 1 | | |
| Comparative Example 32 | | −28 | 70 |
| Aron Powder V-100 | 100 | | |
| Example 33 | | −30 | 100 |
| Vinylidene fluoride resin (Aron Powder F-100) | 99.5 | | |
| Metal compound of organic carboxylic acid (Compound of Example 4 in Japanese Unexamined Patent Publication No. 88743/1984) | 0.5 | | |
| Comparative Example 33 | | −30 | 65 |
| Aron Powder F-100 | 100 | | |
| Example 34 | | −25 | 100 |
| Epoxy resin (Aron Powder E-150) | 99.8 | | |
| Metal compound of organic carboxylic acid (Compound of Example 1 in Japanese Unexamined Patent Publication No. 124357/1982) | 0.2 | | |
| Comparative Example 34 | | −25 | 63 |
| Aron Powder E-150 | 100 | | |
| Example 35 | | −30 | 99 |
| Epoxy resin (Aron Powder E-300) | 99 | | |
| Metal compound of organic carboxylic acid (Compound of Example 2 in Japanese Unexamined Patent Publication No. 88745/1984) | 1 | | |
| Comparative Example 35 | | −30 | 71 |
| Aron Powder E-300 | 100 | | |
| Example 36 | | +27 | 99 |
| Polyester resin (Aron Powder P-100) | 99 | | |
| Alkyl onium salt (Compound of Example 1 in Japanese Unexamined Patent Publication No. 267059/1986) | 1 | | |
| Comparative Example 36 | | +27 | 58 |
| Aron Powder P-100 | 100 | | |
| Example 37 | | +30 | 100 |
| Vinyl chloride resin (Aron Powder V-100) | 99.2 | | |
| Alkyl onium salt (Compound of Example 1 in Japanese Unexamined Patent Publication No. 53944/1987) | 0.8 | | |
| Comparative Example 37 | | +30 | 62 |
| Aron Powder V-100 | 100 | | |
| Example 38 | | −28 | 97 |
| Epoxy resin (Aron Powder E-100) | 99 | | |
| Metal compound of organic carboxylic acid (Compound of Example 1 in Japanese Unexamined Patent Publication No. 141450/1986) | 1 | | |
| Comparative Example 38 | | −28 | 65 |
| Aron Powder E-100 | 100 | | |
| Example 39 | | −25 | 98 |
| Polyester resin (Aron Powder P-100) | 98 | | |
| Metal compound of organic carboxylic acid (Compound of Example 2 in Japanese Unexamined Patent Publication No. 69073/1986) | 2 | | |
| Comparative Example 39 | | −25 | 60 |

TABLE 2-continued

Coating environmental conditions:
Temperature: 20° C.
Relative humidity: 50%

| Resin powder composition (wt. %) | Applied voltage (KV) | Coating efficiency (%) |
|---|---|---|
| Aron Powder P-100 | 100 | |

After the coating, the samples of Examples 2 to 39 were subjected to baking treatment in the same manner as in Example 1, uniform strong excellent coating layers were obtained without falling off of the deposited powders.

EXAMPLE 40

By using the resin powder composition having the same composition as in Example 1, comparative tests for the coating efficiency by a triboelectrification system were conducted by means of an electrostatic powder coating apparatus (BLE-400, manufactured by Toagosei Chemical Industries Co., Ltd.). The results are shown in Table 3. The test conditions for the comparative tests for the coating efficiency were the same as in Example 1 except for the discharge rate.

TABLE 3

| | Coating environmental conditions | | Example (Discharge rate: 180 g/min) | Comparative Example Discharge rate (g/min) | |
|---|---|---|---|---|---|
| | Temp. (°C.) | Relative humidity (%) | | 180 | 90 |
| Coating effi- ciency* (%) | 10 | 20 | 99 | 72 | 89 |
| | 20 | 50 | 100 | 75 | 90 |
| | 25 | 85 | 99 | 40 | 50 |

*Coating efficiency =
$$\frac{\text{Coating weight} \times \text{Moving speed of substrate}}{\text{Discharge rate} \times \text{Width of substrate}} \times 100$$

It is evident from the results in Table 3 that in the case of the Comparative Example wherein no electric charge-increasing agent was incorporated, the coating efficiency did not reach the level of the Example even when the discharge rate was reduced to one half, and the coating efficiency varies depending upon the coating environmental conditions. Whereas, in the case of the Example of the present invention wherein an electric charge-increasing agent was incorporated, the coating efficiency was substantially 100% without any substantial influence by the change of the coating environment.

After the coating, the sample was subjected to baking treatment at 200° C. for 30 minutes, whereby a uniform strong excellent coating layer was obtained without falling off of the deposited powder up to the baking treatment step. In the case of the Comparative Example, falling off of the deposited powder was observed during the period up to the baking treatment step.

Now, Examples 41 to 59 conducted by a triboelectrification system in the same manner as in Example 40 are shown in Table 4 together with the respective Comparative Examples.

TABLE 4

Coating conditions:
Temperature: 20° C.
Relative humidity: 80%
Discharge rate: 180 g/min

| Resin Powder Composition | Coating efficiency (%) | Falling off deposited powder up to backing step |
|---|---|---|
| Example 41 | 100 | None |
| Same as Example 2 | | |
| Comparative Example 41 | 38 | Slight |
| Same as Comparative Example 2 | | |
| Example 42 | 99 | None |
| Same as Example 4 | | |
| Comparative Example 42 | 78 | None |
| Same as Comparative Example 4 | | |
| Example 43 | 96 | None |
| Same as Example 7 | | |
| Comparative Example 43 | 45 | Slight |
| Same as Comparative Example 7 | | |
| Example 44 | 100 | None |
| Same as Example 8 | | |
| Comparative Example 44 | 74 | None |
| Same as Comparative Example 8 | | |
| Example 45 | 98 | None |
| Same as Example 10 | | |
| Comparative Example 45 | 41 | None |
| Same as Comparative Example 10 | | |
| Example 46 | 100 | None |
| Same as Example 13 | | |
| Comparative Example 46 | 65 | None |
| Same as Comparative Example 13 | | |
| Example 47 | 99 | None |
| Same as Example 16 | | |
| Comparative Example 47 | 39 | Slight |
| Same as Comparative Example 16 | | |
| Example 48 | 100 | None |
| Same as Example 17 | | |
| Comparative Example 48 | 63 | None |
| Same as Comparative Example 17 | | |
| Example 49 | 98 | None |
| Same as Example 19 | | |
| Comparative Example 49 | 58 | None |
| Same as Comparative Example 19 | | |
| Example 50 | 99 | None |
| Same as Example 20 | | |
| Comparative Example 50 | 65 | None |
| Same as Comparative Example 20 | | |
| Example 51 | 100 | None |
| Same as Example 22 | | |
| Comparative Example 51 | 43 | Slight |
| Same as Comparative Example 22 | | |
| Example 52 | 100 | None |
| Same as Example 25 | | |
| Comparative Example 52 | 70 | None |
| Same as Comparative Example 25 | | |
| Example 53 | 99 | None |
| Same as Example 26 | | |
| Comparative Example 53 | 43 | Slight |
| Same as Comparative Example 26 | | |
| Example 54 | 100 | None |
| Same as Example 29 | | |
| Comparative Example 54 | 61 | None |
| Same as Comparative Example 29 | | |
| Example 55 | 97 | None |
| Same as Example 30 | | |
| Comparative Example 55 | 42 | None |
| Same as Comparative Example 30 | | |
| Example 56 | 100 | None |
| Same as Example 32 | | |
| Comparative Example 56 | 53 | None |
| Same as Comparative Example 32 | | |
| Example 57 | 99 | None |
| Same as Example 39 | | |
| Comparative Example 57 | 45 | Slight |
| Same as Comparative Example 39 | | |
| Example 58 | 100 | None |
| Same as Example 34 | | |
| Comparative Example 58 | 65 | None |
| Same as Comparative Example 34 | | |
| Example 59 | 99 | None |

TABLE 4-continued

Coating conditions:
Temperature: 20° C.
Relative humidity: 80%
Discharge rate: 180 g/min

| Resin Powder Composition | Coating efficiency (%) | Falling off deposited powder up to backing step |
|---|---|---|
| Same as Example 36 Comparative Example 59 Same as Comparative Example 36 | 47 | None |

After the coating, the samples of Examples 41 to 59 were subjected to baking treatment in the same manner as in Example 40, whereby uniform strong excellent coating layers were obtained.

Although the theoretical antistatic mechanism of the electric charge-increasing agent in the present invention has not yet been clearly understood, it is evident that as compared with the comparative composition containing no electric charge-increasing agent, the resin powder composition containing the electric charge-increasing agent can easily be charged with an electric charge to a level required for the resin powder by a corona application system even when the applied voltage is lower than the comparative composition, whereby the coating efficiency can be remarkably improved. Further, since the applied voltage can be low, the danger of the apparatus and handling can be avoided, and the operation can be extremely safe and can easily be conducted. In the triboelectrification system, the required level of electric charge can readily be reached in a very short period of time by triboelectrification treatment. This leads to a reduction of the size of the apparatus or to a reduction of the air required for triboelectrification, whereby the coating efficiency can be remarkably improved. In either system, the charged resin powder has excellent stability with no substantial change in the electric charge and with no substantial influence by the change in the temperature or humidity, by virtue of the incorporated electric charge-increasing agent, and no substantial attenuation of the electric charge is observed, whereby no falling off of the deposited powder is observed. Accordingly, the coating efficiency is as high as from 95 to 100%, and the penetrability is extremely good. This indicates that by using the composition of the present invention, no operation or apparatus for the recovery, or no special place where the temperature, humidity, etc. must be specially adjusted, is required, and a uniform coating can be formed without irregularity on a substrate of any shape. Further, by selecting the type and content of the electric charge-increasing agent, the type of the resin, the layer thickness and the layer quality can optionally be selected depending upon the particular purpose of the substrate to be coated. The simplification or reduction of the size of the coating installation or apparatus or equipments, the color change, etc. can easily be conducted, whereby the range of the application will be substantially broadened.

We claim:

1. In method for electrostatic coating, which comprises electrostatically coating a surface with a resin powder composition, wherein said composition comprises a thermosetting or thermoplastic resin the improvement comprising incorporating into said resin, an electric charge-increasing agent selected from the group consisting of a phthalocyanine compound, an anthraquinone compound, a metal compound of an organic carboxylic acid and an alkyl onium salt.

2. The method according to claim 1, wherein the electric charge-increasing agent is incorporated in an amount of from 0.01 to 20% by weight relative to the resin.

3. The method according to claim 1, wherein the resin powder composition has a particle size of from 30 to 250 μm.

4. The method according to claim 1, wherein the thermosetting resin is an epoxy resin, a polyester resin or an acrylic resin.

5. The method according to claim 1, wherein the thermoplastic resin is a vinyl chloride resin, a polyamide resin, a cellulose resin, a polyolefin resin, a polyethylene resin, a polyester resin or a nylon resin.

* * * * *